United States Patent [19]

Grimes

[11] 4,415,393
[45] Nov. 15, 1983

[54] METHOD OF MAKING A FRANGIBLE PORT PROTECTOR

[75] Inventor: Robert G. Grimes, Vernon Hills, Ill.

[73] Assignee: Baxter Travenol Laboratories, Inc., Deerfield, Ill.

[21] Appl. No.: 313,568

[22] Filed: Oct. 22, 1981

[51] Int. Cl.³ .................. B29D 23/04; B32B 31/18
[52] U.S. Cl. .................. 156/244.13; 156/244.18; 156/257; 156/293; 215/32; 215/33; 215/232; 220/266; 220/267; 220/268; 220/269; 220/276; 220/277; 222/107; 604/403; 604/415
[58] Field of Search ............ 156/244.13, 244.18, 156/249, 257, 268, 293, 294, 304.2, 304.3; 128/214 R, 214 D, 214 C, 272; 83/187, 875, 879, 880, 881, 886; 222/107, 541; 215/32, 33, 34, 35, 232; 206/484, 484.2; 220/266, 267, 268, 269, 276, 277

[56] References Cited

U.S. PATENT DOCUMENTS

| | | | |
|---|---|---|---|
| 920,178 | 8/1906 | Stegmaier . | |
| 3,205,889 | 9/1965 | Alder et al. | 128/272 |
| 3,353,714 | 11/1967 | Trecek | 222/107 |
| 3,509,879 | 5/1970 | Bathish et al. | 128/214 |
| 3,615,034 | 10/1971 | Lemelson | 220/266 |
| 3,777,949 | 12/1973 | Chiquiari-Arias | 222/541 |
| 3,788,374 | 1/1974 | Saijo | 128/272 |
| 3,908,654 | 9/1975 | Lhoest | 128/218 M |
| 3,915,212 | 10/1975 | Bujan et al. | 150/8 |
| 3,951,148 | 4/1976 | Herb | 128/272 |
| 3,951,313 | 4/1976 | Coniglione | 222/186 |
| 3,986,507 | 10/1976 | Watt | 128/214 |
| 3,993,223 | 11/1976 | Welker | 222/107 |
| 3,994,412 | 11/1976 | Difiglio | 220/266 |

*Primary Examiner*—Caleb Weston
*Attorney, Agent, or Firm*—Paul Flattery; John Caruso; Garrettson Ellis

[57] ABSTRACT

A method of manufacturing a tear-off port protector for a container comprises placing flexible, typically extruded tubing on a mandrel that fills the bore of the tubing, with the tubing preferably outwardly stretched by the mandrel. A cutting blade is spaced a predetermined distance of less than the tubing wall thickness from the mandrel. One then causes the cutting blade to form an annular cut about the tubing, while maintaining the predetermined distance, and thereafter one removes the tubing from the mandrel.

5 Claims, 4 Drawing Figures

U.S. Patent     Nov. 15, 1983     4,415,393
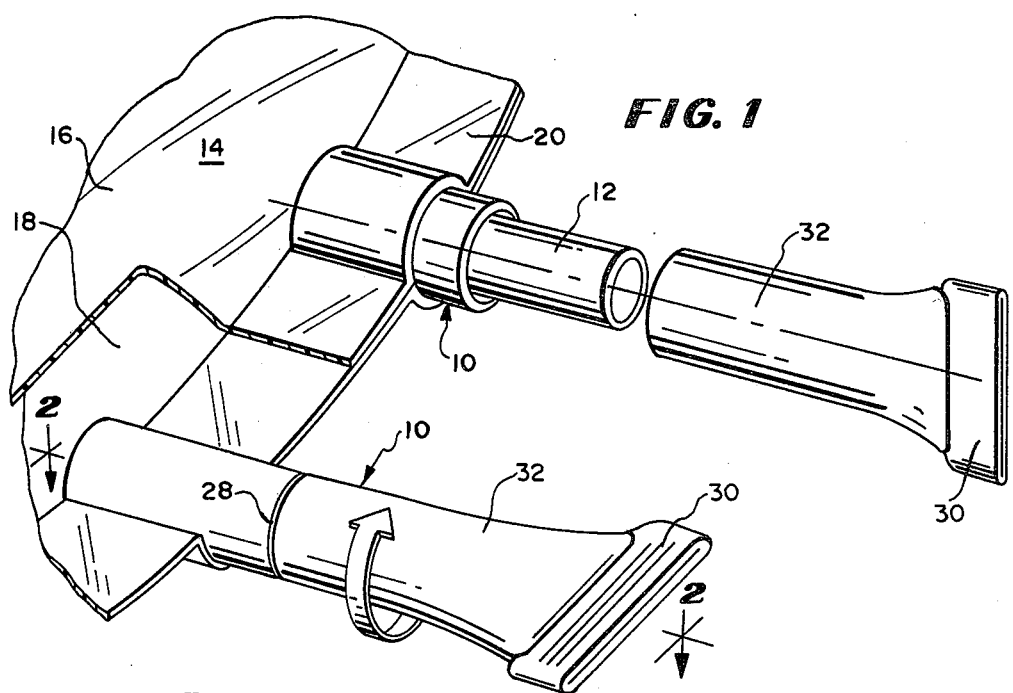
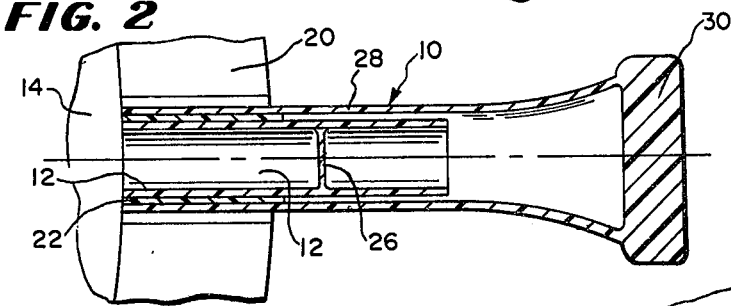
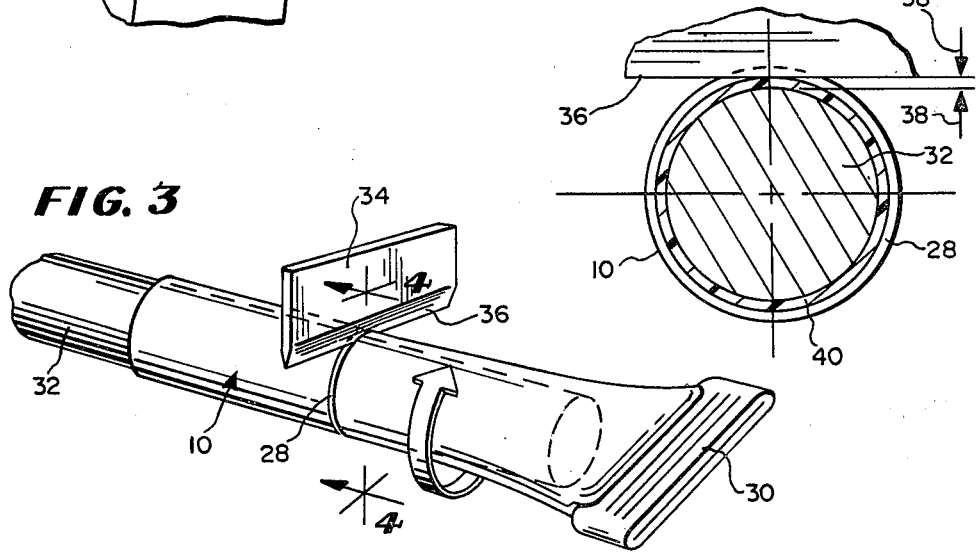

METHOD OF MAKING A FRANGIBLE PORT PROTECTOR

TECHNICAL FIELD

The invention relates to protective covers for ports in containers, particularly flexible containers for dispensing and receiving liquids such as blood bags and parenteral solution containers for use in intravenous administration, or as a dialysis solution, for example.

Such containers are often made of plastic, and carry a port which is proportioned for communication with a tubular set for flow of the liquid into or out of the container. Typically, the port contains a diaphragm, blocking off its bore at a central location thereof, which is penetrated by a spike on the end of the set.

However, it is necessary for the outer portion of the port to be protected from contamination, so customarily a port protector is provided, which is removed when access to the container through the port is desired.

DESCRIPTION OF PRIOR ART

In Difiglio U.S. Pat. No. 3,994,412 a molded port protector for a container is disclosed comprising a closedend tube surrounding the port of the container with an annular tearaway line of weakness. The line of weakness is of variable depth, because, as stated in the patent, it is not practical to mold a thin line of weakness having only 0.005 to 0.008 inch wall thickness, while keeping the thickness uniform. Accordingly, the solution of this patent is to provide only small sections of the line of weakness which are that thin, with the remaining sections being thicker.

Bathish et al. U.S. Pat. No. 3,509,879 discloses a port protector which is attached to the end of the port, and has a tear-off cap and a laterally projecting handle to facilitate manual tearing off of the cap along an annular, thin line of tearing weakness.

Other prior art of similar import is also known, in which a protective cap has an annular line of weakness for tearing away. Generally, all of the prior art relates to molded closures in which the line of tearing weakness is also molded into the closure.

In accordance with this invention, a method is provided for forming a tear-off port protector, in which the line of tearing weakness can be formed in a port protector which, in turn, can be made from extruded tubing, to provide a port protector which is significantly cheaper than a molded port protector.

While it is known that the dimensions of extruded tubing cannot be controlled as accurately as a molded item, the method of this invention provides a line of tearing weakness in which the thickness of material to be torn under the line of tearing weakness can be controlled with high accuracy, despite the fact that the overall dimensions of the extruded tubing may be less accurate than in a molded item. Thus, an inexpensive article may have reliable and reproducable tear-open characteristics.

DESCRIPTION OF THE INVENTION

In accordance with this invention, a method of manufacturing a tear-off port protector for a container is provided which comprises the following:

Flexible tubing, typically extruded plastic tubing of polyvinyl chloride tubing or the like is placed on a mandrel that fills the bore of the tubing, and typically is slightly oversized with respect to the bore to stretch the tubing radially outwardly, for firm securence of the mandrel in the bore.

A cutting blade is spaced a predetermined distance of less than the tubing wall thickness from the mandrel. One causes the cutting blade to form an annular cut about the tubing, while maintaining the predetermined distance. Thereafter, the tubing is removed from the mandrel.

One end of the tubing may be sealed shut by a conventional heat sealing or solvent sealing procedure, while the other end of the tubing may be sealed to a container with an access port positioned in telescoping relation inside of the tubing. Accordingly, when it is desired to gain access to the access port, one tears open the tubing along the annular cut, to expose the access port.

It is also preferred for the tubing to be sealed to the access port through a spacer bushing positioned within the tubing. As the result of this, the tubing is generally out of contact with the access port, so that when the annular cut is severed, typically by manual twisting of the outer end of the tubing, the severed end of the tubing tends to fall off, and there is no tendency for the severed end of the tubing to be frictionally retained on the access port. Typically the tubing is sealed to the container at its outside surface.

The predetermined distance of the cutting blade from the surface of the mandrel may be from 0.003 to 0.012 inch, preferably 0.005 to 0.01 inch. The predetermined distance governs the break force of the annular cut, so that the break force can be adjusted to the desired conditions of use by the simple adjustment of the predetermined distance.

The wall thickness of the tubing may preferably be from about 0.02 to 0.05 inch, and the inner diameter of the tubing may be about 0.2 to 0.35 inch, although it is contemplated that the invention of this application can be used on any type of plastic tubing, typically extruded tubing, of any dimensions, or even on metal tubing in such cases where that might be desired.

BRIEF DESCRIPTION OF THE DRAWINGS

FIG. 1 is a fragmentary perspective view, with portions broken away, of a portion of a blood bag utilizing the port protector of this invention, one of the port protectors having been severed along its annular cut and the outer portion removed.

FIG. 2 is a longitudinal sectional view along line 2—2 of FIG. 1 of an access port of the blood bag of FIG. 1 and the port protector of this invention.

FIG. 3 is a longitudinal sectional view of a manufacturing step of this invention, showing the flexible tubing positioned on the mandrel and being rotated with respect to a cutting blade, which is spaced a predetermined distance from the mandrel.

FIG. 4 is a sectional view taken along line 4—4 of FIG. 3.

DESCRIPTION OF SPECIFIC EMBODIMENT

Referring to FIGS. 1 and 2, tear-off port protectors 10 in accordance with this invention are disclosed. The port protectors 10 surround and seal, until time of use, ports 12, which may be carried by a container 14, which in the specific embodiment shown comprises a pair of plastic sheets 16, 18 sealed together at their periphery 20. Typically, the plastic container 14 may comprise sheets of polyvinyl chloride plastic, heat-sealed together to form a container of known design (except for the improvements of this invention) for the collection of storage of blood, or for the storage of sterile solutions for intravenous injection, hemodialysis, peritoneal dialysis, or other use.

As shown, port protector 10 is sealed between the plastic sheets 16, 18, and extends through the plastic peripheral seal 20 to permit flow communication to and from the bag interior upon opening thereof.

As particularly shown in FIG. 2, port protector 10 is sealed at its exterior surface within the sealed periphery 20 of container 14. Bushing 22 is positioned in telescoping relation within the bore of tubular port protector 10, adjacent its inner end, and is sealed to it by heat sealing or the like. Sealed, tubular port 12 then fits within the bore of bushing 22 and is sealed to the bushing for firm retention of port 12 in position relative to seal line 20 of the container. As is conventional, port 12 carries a diaphragm 26, which occludes its bore, and may be punctured by a penetrating spike when access to the container is desired.

Annular cut line of weakness 28 is also provided, where the wall thickness decreases to a predetermined distance of typically 0.005 to 0.01 inch, significantly thinner than the wall thickness of the tubing, which may be typically from 0.02 to 0.05 inch.

Tubular port protector 10 also may have a sealed outer end 30, typically heat sealed, which provides an economical and simple means of closing it off.

When it is desired to open the port protector of this invention, one merely twists the outer portion 32 of port protector 10 with the result that rupturing occurs along line of weakness 28, and the outer portion 32 may be removed as shown in FIG. 1, exposing port 12 so that the connection may be made with a spike on the end of a set. The outer portion 32 may also be pulled to rupture line 28, or folded over to the same effect, if that is preferred.

Thus the port protector of this invention is effective, but very simple and easy to make from extruded tubing as described below.

Referring to FIGS. 3 and 4, the manufacture of the port protector of this invention is provided. A length of extruded tubing forming port protector 10 may be cut from a main supply of extruded tubing, and placed upon cylindrical mandrel 32, which is slightly oversized relative to the inner diameter of port protector 10, so as to preferably stretch it slightly. Port protector 10 may be made of a polyvinyl chloride plastic, for example, or any other type of preferably thermoplastic material which is compatible for sealing with the material of container 14, and bushing 22 when such is used. The material of port protector 10 should be sealingly compatible with the material of port 12 in the event that port 12 is directly sealed to the interior of port protector 10.

Cutting blade 34 may be placed in a jig or other appropriate holder, with the edge 36 of blade 34 being spaced from mandrel 32 by a predetermined distance which is less than the thickness of the tubing wall that forms port protector 10. Accordingly, as shown in FIG. 3, mandrel 32 may be rotated to cause the annular cut 28 to be formed, with the thickness of the remaining wall of port protector 10 below annular cut 28 being very precisely controlled.

Specifically as shown in FIG. 4, the overall thickness of tubing 10 is shown, plus the depth of cut 28 as indicated between arrows 38, the distance between arrows 38 being controlled by the position of edge 36 of blade 34 and the outer surface of mandrel 32. Accordingly, the wall thickness 40 underneath cut 28 can be very precisely controlled, even if the overall wall thickness of extruded tubing 10 is not very accurate, as is often the case in extruded material. Because the depth of wall portion 40 underneath cut portion 28 can be made to highly uniform specifications by the method of this application, the tear-off characteristics of the device of this invention can be precisely controlled, so that it safely provides hermetic sealing of the port 24 until use is desired, but then it can be relatively easily removed by a nurse or another person without difficulty.

It has been found that the relationship between wall thickness 40 under cut portion 28 and the force required to sever the outer portion 32 of port protector close to proportional. For example, in a test in which a polyvinyl chloride plastic blood bag carried a structure of the design disclosed herein, specific break forces correlated with the thickness of wall 40 were determined. Semifinished polyvinyl chloride blood bags were tested of the design disclosed herein in which all parts were made of the same polyvinyl chloride formulation.

Port 12 had an inner diameter of 0.187 inch and a wall thickness of 0.032 inch, being one inch long.

Bushing 22 had an inner diameter of 0.250 inch and a wall thickness of 0.018 inch, being 0.375 inch long.

Tubular port protector 10, being also of polyvinyl chloride, had an inner diameter of 0.286 inch, a wall thickness of 0.030 inch and a length of 0.175 inch.

Port protector tubing 10 was scored with a knife as described above approximately 7/16 inch from its inner end. Spacer bushing 22 was then inserted into the port 12 so that their inner ends were all approximately flush. Port protector 10 was then added and positioned so that all three inner ends of the telescoping components 10, 22, 12 were approximately flush.

The outer end of port protector 10 was then sealed closed to form end 30 by an RF heat sealer. This assembly was then placed in a conventional blood bag sealing die, and heat sealed along with the periphery of the blood bag.

Four hundred sixty-seven of such sealed structures were tested, with the break force in pounds required to open the port protector being recorded as a function of the particular thickness 40 of plastic material under annular cut 28.

After conventional steam sterilization, the mean results were as indicated in Table 1 below.

TABLE 1

| Plastic Material Thickness Under Annular Cut | Break Force (lbs.) | | |
|---|---|---|---|
| | Maximum Observed | Minimum Observed | Mean |
| 0.006 inch | 8.0 | 5.3 | 6.9 |
| 0.007 inch | 10.25 | 7.0 | 8.5 |
| 0.008 inch | 11.0 | 8.7 | 10.0 |
| 0.009 inch | 14.0 | 11.3 | 12.8 |
| 0.010 inch | 15.3 | 13.8 | 14.3 |
| 0.011 inch | 19.0 | 15.8 | 17.6 |

Accordingly, it can be seen that the desired break force can be easily built into the port protectors of this invention within a relatively narrow range simply by adjustment of the dimension of wall thickness 40 under annular cut 28 which, in turn, is adjusted by a simple adjustment of the jig or other device that holds blade 34. In the event of a change in the hardness or strength of the plastic used to make port protector 10, thickness 40 can be quickly adjusted within a few minutes, if spot checking of the products of the method of this invention shows that adjustment is necessary.

Accordingly, cost savings in port protectors can be achieved by this invention through the use of extruded tubing rather than molded material. At the same time, easy adjustability of characteristics can be obtained to account for variation in the physical properties of the plastic used, where needed, for an advance in the simplicity, economy and versatility of port protectors, which are used on a very large scale in the medical field.

The above has been offered for illustrative purposes only, and is not intended to limit the scope of the invention of this application, which is as defined in the claims below.

That which is claimed is:

1. The method of manufacturing a tear-off port protector carried on a container which comprises placing extruded plastic tubing on a mandrel that fills the bore of said tubing and stretches the tubing; spacing a cutting blade a predetermined distance of less than the tubing wall thickness from the mandrel and rotating said mandrel and tubing carried thereon, causing the cutting blade to form an annular cut about the tubing while maintaining the predetermined distance; removing the tubing from the mandrel, closing one end of the tubing, and sealing the outside surface of the other end of the tubing to said container with an access port positioned in telescoping relation inside of said tubing, said tubing sealed to the access port through a spacer bushing positioned within said tubing, whereby tearing open of said tubing along the annular cut exposes the access port.

2. The method of claim 1 in which the closed end of said tubing is sealed shut.

3. The method of claim 2 in which said predetermined distance is from 0.005 to 0.01 inch.

4. The method of claim 3 in which the wall thickness of said tubing is from 0.02 to 0.05 inch.

5. The method of claim 4 in which said tubing has an inner diameter of 0.2 to 0.35 inch.

* * * * *